Patented Apr. 18, 1933

1,904,619

UNITED STATES PATENT OFFICE

GEORGE V. CAESAR, OF NEW YORK, N. Y., ASSIGNOR TO STEIN, HALL & COMPANY, INC., A CORPORATION OF NEW YORK

ADHESIVE AND PROCESS OF MAKING SAME

No Drawing.   Application filed December 31, 1928. Serial No. 329,673.

The invention relates to a new adhesive composition and to a process of making the same.

Previously in order to effect the conversion of non-protein carbohydrate materials to form glues or adhesives in a cold way it was considered essential to use a relatively large amount of caustic alkali, namely from 7 to 10% or more of the amount by weight of tapioca flour or similar carbohydrate material. Since it is desirable, particularly when the glue is to be used in the gluing of wood and wood veneers which tend to become discolored or stained by a strongly alkaline glue, to keep the alkali content of the glue as low as possible, and as it is also desirable to dispense with the heat treatment I have found it possible to produce in a cold way a glue with moderate alkali content and possessing the improved properties as to workability, adhesiveness and cohesiveness obtained by the use of a "cutting" agent.

A principal object of the present invention, therefore, is to produce a starch or a similar non-protein carbohydrate glue which may be prepared without the application of heat and with the use of low percentages of caustic alkali.

I have found that such a glue is produced when one particular member of the class of per-salts, namely calcium peroxide, is added to a mixture of tapioca flour or a similar non-protein carbohydrate material and potassium dichromate, or a similar complex alkali and/or alkaline earth metal salt, and the resulting compound is treated with cold water and from 4 to 6%, based upon the dry weight of the tapioca flour, of caustic alkali. In other words, I have found that when calcium peroxide is used in the mixture it appears to exert a desirable cutting action and improve the water-resistance of the glue when the conversion treatment is carried on in a cold way and with the use of a smaller proportion of caustic alkali than is feasible when preparing in a cold way a glue from such non-protein carbohydrate materials without the use of calcium peroxide as the "cutting" agent. A cutting agent is a substance which acts to soften and thin the material under treatment and to render it more workable.

The following are typical examples of proportions and procedure which may be used in preparing a glue suitable for wood veneering and similar uses according to the present invention:

Formula No. 1

A dry mixture in the proportions of 100 lbs. cassava or tapioca flour, ¾ lb. of potassium dichromate and 1 lb. of calcium peroxide is prepared. This dry mixture is then added to 200 lbs., more or less depending on the use to which the glue product is to be applied, of cold water, and the whole thoroughly mixed. During the mixing operation a solution of 5 lbs. of caustic soda in about twice its weight of water is slowly added. The mixing is then continued, without the application of heat, or in any event under such conditions of heat control that the temperature of the mixture does not at any time rise to or above 110° F., until the conversion is carried to the point where a glue or adhesive possessing the desired workability and characterized by the desired viscosity, adhesiveness and cohesiveness is produced.

Formula No. 2

A dry mixture in the proportions of 100 lbs. of cassava or tapioca flour, 1½ lbs. of potassium dichromate and 1 lb. of calcium peroxide is prepared. Cold water and caustic alkali in the amounts and in the manner indicated under Formula No. 1 are then incorporated with the dry mixture.

Formula No. 3

A dry mixture in the proportions of 99 lbs. cassava or tapioca flour, ¾ lb. of potassium dichromate and ¼ lb. of calcium peroxide is prepared. This is added to 218 parts of water, and 5 lbs. of caustic soda. The caustic soda may be dissolved in a part of the aforesaid water, in proportions, say, of 1:3 or more, before incorporating it into the mass. The mass is then mixed for from 30 to 45 minutes depending of course upon the type of mixer used.

While I have specified potassium dichromate in the specific examples above given, it will be understood that other complex salts of the alkali and alkaline earth metals may be used, e. g. the chromates of potassium, sodium, calcium, magnesium, ammonium, lithium, and the dichromates of potassium and sodium, as well as the alkali pyro antimoniates. The pyro antimoniates may be used either alone or mixed with potassium dichromate and calcium peroxide. A glue of good water resistance and other satisfactory properties may be prepared by using potassium pyro antimoniate in the proportion of 1½ lbs. to 100 lbs. of cassava or tapioca flour and thoroughly incorporating the dry mixture thus formed with cold water and caustic alkali in the proportions and in the manner set forth under Formula No. 1. Alternatively the potassium pyro antimoniate may be added to a mixture of potassium dichromate and calcium peroxide or mixed with calcium peroxide or other "cutting" agent, omitting the potassium dichromate. It will be understood that the proportions of dichromate or pyro antimoniate and of the "cutting" agent may be varied somewhat from the amounts above indicated. Good results have been obtained with proportions of dichromate varying from one-fourth of one per cent to two per cent by weight.

While I have indicated as a specific example of a non-protein carbohydrate material, cassava or tapioca flour, it will be understood that other non-protein polysaccharide carbohydrate materials such as the various starches derived from the potato, corn and other sources may be used.

While the invention has been described with particular reference to the preparation of a glue suitable for use in wood veneering operations, it will be understood that it is equally applicable in preparing sizes and other adhesives; in particular, various sizes and adhesives used in textile and paper manufacture.

When I speak of a complex salt having the characteristics of an alkali salt of an acid of chromium I intend it to be understood that I include thereby alkaline earth salts as well as alkali salts of acids such as chromic and antimonic, which have the property of reacting with poly-saccharide carbohydrates to modify them so that they will form an adhesive compound when treated with a solution of caustic alkali.

What I claim is:

1. A composition for use in making adhesives which comprises a non-protein poly-saccharide carbohydrate having the characteristics of starch, a chromium salt and calcium peroxide.

2. A composition for use in making adhesives which comprises a non-protein poly-saccharide carbohydrate having the characteristics of starch, potassium dichromate and calcium peroxide.

3. A composition for use in making adhesives which comprises 100 parts non-protein poly-saccharide carbohydrate having the characteristics of starch, 1½ parts of potassium dichromate, and approximately 1 part of calcium peroxide.

4. A glue formed of a non-protein poly-saccharide carbohydrate having the characterstics of starch by interaction therewith of water, caustic alkali, a chromium salt, and calcium peroxide.

5. A glue formed of a non-protein poly-saccharide carbohydrate having the characteristics of starch by interaction therewith of water, caustic alkali, potassium dichromate, and calcium peroxide.

6. A process of making a non-protein poly-saccharide carbohydrate base adhesive which comprises admixing a chromium salt and calcium peroxide with a non-protein poly-saccharide carbohydrate having the characteristics of starch and agitating such admixture with water and caustic alkali at a temperature below 110° F. for such time as to produce a product possessing the viscosity, adhesiveness and cohesiveness suitable for use in gluing wood veneers and similar materials.

7. A composition for use in making adhesives which comprises 100 parts non-protein poly-saccharide carbohydrate having the characteristics of starch, ¼ to 2% by weight of potassium dichromate, and calcium peroxide.

8. A composition for use in making adhesives which comprises 100 parts non-protein poly-saccharide carbohydrate having the characteristics of starch, ¼ to 2% by weight of potassium dichromate, and approximately 1 part of calcium peroxide.

In testimony whereof, I have signed my name to this specification this 20th day of December, 1928.

GEORGE V. CAESAR.